United States Patent Office 2,778,767
Patented Jan. 22, 1957

2,778,767

PHOSPHORUS DERIVATIVES OF KOJIC ACID AND PROCESS OF PREPARATION

Jean Metivier, Arpajon, France, assignor to Societe des Usines Chimiques Rhone-Poulenc, Paris, France, a French body corporate No Drawing. Application March 2, 1956,
Serial No. 568,967

Claims priority, application France October 23, 1956

10 Claims. (Cl. 167—33)

This invention relates to new phosphorus esters and their preparation.

It is an object of the invention to provide new phosphorus derivatives of considerable industrial interest and more particularly useful as insecticidal agents.

The compounds of the present invention are phosphorus derivatives of kojic acid of the general formula:

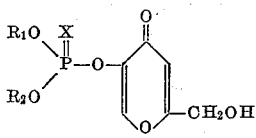

where X represents an oxygen atom or a sulphur atom and $R_1$ and $R_2$ are the same or different and are each a lower aliphatic radical containing up to 4 carbon atoms, e. g. methyl or ethyl.

The new products may be obtained, according to a feature of the invention, by reacting an acid chloride of the formula:

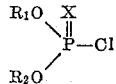

with an alkali salt of kojic acid of the general formula:

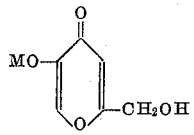

where M represents an atom of an alkali metal.

The alkali salts of kojic acid just referred to may themselves be made, for example, by reacting an alkali alcoholate, e. g. sodium ethylate, with kojic acid in alcoholic solution.

The condensation of the acid chloride with the said alkali salt of kojic acid is preferably carried out in an alcoholic medium, e. g. in ethanol and it is convenient to effect such reaction consecutively with the production of the alkali salt by adding the acid chloride to the reaction mixture containing the alkali salt. The condensation takes place at ordinary room temperature but may be effected at elevated temperature, e. g. at the boiling temperature of the solvent employed.

These esters have been found to be interesting as pesticides and, more particularly, as systemic insecticides. They may be used in various forms, such as powders, sprays, aerosols, emulsions or solutions in organic or aqueous organic media. In the case of aqueous emulsions it is preferred to add a wetting, dispersing or emulsifying agent of the ionic or non-ionic type, especially the latter which are not affected by electrolytes. The emulsion type of formulation is preferably made up as a self-emulsifying concentrate containing the active substance dissolved in the dispersing agent or in a solvent compatible with that dispersing agent, the composition being made ready for use by the simple addition of water. The new compounds may also be employed in admixture with synergistic products or, broadly, with other insecticides. The use of these products as pesticides and the various forms of use hereinbefore mentioned above are also within the scope of the present invention.

A convenient test to apply to determine the optimum conditions of use of the compounds of this invention, as contact insecticides, consists in charging vessels of 125 cc. capacity with 2 cc. quantities of solutions of the compound at various dilutions in acetone, evaporating the acetone while spreading the solution to leave the product in finely divided condition, introducing the insects to the vessels and after a period removing the insects and counting the proportion killed. A control test is preferably carried out using pure acetone.

So tested the compound of Example I which follows causes the death of 100% of domestic flies at a dilution of 1 in 10,000 and causes the death of 100% of tribolium confusum at a dilution of 1 in 1,000. The compound of Example II which follows, causes the death of 100% of domestic flies, at a dilution of 1 in 10,000 and causes the death of 100% of tribolium confusum at a dilution of 6 in 10,000.

A convenient test to apply to determine the optimum conditions of use of the compounds of the invention as systemic insecticides consists in studying their effect on black fly, species *Aphis rumicis*, on dwarf nasturtium variety "Tom Thumb" mixed. The nasturtiums are brought to a fixed stage of development by growth for 4 days at 25° and then a further 4 days in a strongly lit open cupboard. The nasturtiums are treated with an aqueous solution of the compound of this invention at a selected dilution by immersion in a tube containing the solution, the tube being closed with a plug of cotton wool to reduce loss by evaporation. Two days later the nasturtiums are contaminated with black fly placed in groups of five in tiny glass vessels on the primary leaves. The number of deaths resulting are counted.

So tested the compound of Example I which follows used in a concentration of 1 in 10,000 causes the death of 100% of the black fly in 3 days and used in a concentration of 1 in 100,000 causes the death of 6% of the black fly in 3 days. Similarly, the product of Example II which follows, used in a concentration of 1 in 100,000 causes the death of 100% of the black fly in 3 days and used in a concentration of 1 in 1,000,000 causes the death of 100% of the black fly in 5 days.

The following non-limitative examples show how the invention may be put into practice.

Example I

A vessel is charged with 11.3 g. of kojic acid and 175 cc. of ethyl alcohol. The mixture is stirred for five minutes and 76 cc. of a 1.05 N sodium ethylate solution are added. This mixture is brought to boiling point with stirring and then cooled to about 20° C.

To this cold mixture are added 15 g. of chlorodiethyl-thiophosphate. The reaction is weakly exothermic (the temperature rises to +27° C. and then remains at this level). The mixture is agitated for 1½ hours at room temperature and then refluxed for 45 minutes, at the end of which time the heating is stopped. The product is cooled to about 20° C., the sodium chloride precipitate is separated, and the solution is then treated with de-colorising charcoal. The alcohol is then driven off under reduced pressure and the viscous residue is taken up in 100 cc. of carbon tetrachloride, whereby the unreacted kojic acid is separated. The solution is washed with 3 lots of water (50 cc. each), and then treated with de-colorising charcoal and filtered. The product is concentrated under reduced pressure until no further solvent distils. An orange-yellow oil is obtained, which is sparingly soluble in water, but is soluble in alcohol and acetone, and the analysis of which corresponds to the diethylthiophosphate of kojic acid.

Percent P: Found, 10.90; calculated, 10.54.
Percent S: Found, 11.25; calculated, 10.88.

*Example II*

A vessel is charged with 14.2 g. of kojic acid and 150 cc. of ethyl alcohol, and the mixture is stirred and heated to about 80° C. The dissolution is practically complete. The mixture is brought to 25° C. and 150 cc. of a normal sodium ethylate solution are added. The mixture is brought to boiling point with stirring and then cooled to 20° C.

17.25 g. of chlorodiethylphosphate are added to the cold mixture during five minutes. The reaction is weakly exothermic. The temperature rises to 31° C. and remains at this level. The mixture is stirred at room temperature for 30 minutes, the precipitated salt is filtered and the filtrate is treated with decoloring charcoal. The solvent is driven off under reduced pressure. The residue is a viscous orange-coloured oil which is soluble in water, alcohol and acetone, but only sparingly soluble in carbon tetrachloride in the cold. Analysis shows that this substance is the diethylphosphate of kojic acid.
Percent P: Found, 10.80; calculated, 11.15.

I claim:

1. A phosphorus derivative of kojic acid of the general formula:

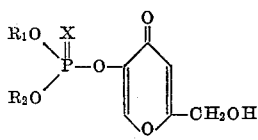

where X is selected from the group consisting of oxygen and sulphur atoms and $R_1$ and $R_2$ are each an alkyl radical containing at most 4 carbon atoms.

2. A phosphorus derivative of kojic acid of the formula:

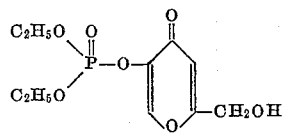

3. A phosphorus derivative of kojic acid of the formula:

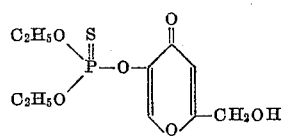

4. A process for the production of a phosphorus derivative of kojic acid of the general formula:

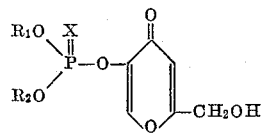

where X is selected from the group consisting of oxygen and sulphur atoms and $R_1$ and $R_2$ are each an alkyl radical containing at most 4 carbon atoms, which comprises reacting an acid chloride of the formula:

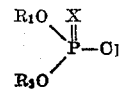

with an alkali salt of kojic acid of the general formula:

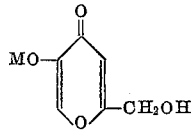

where M represents an atom of an alkali metal.

5. A process for the production of a phosphorus derivative of kojic acid of the general formula:

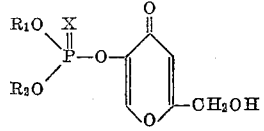

where X is selected from the group consisting of oxygen and sulphur atoms and $R_1$ and $R_2$ are each an alkyl radical containing at most 4 carbon atoms, which comprises reacting in an alcoholic medium an acid chloride of the formula:

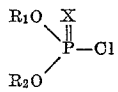

with an alkali salt of kojic acid of the general formula:

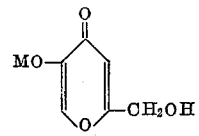

where M represents an atom of an alkali metal.

6. A process for the production of a phosphorus derivative of kojic acid of the formula:

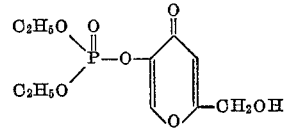

which comprises reacting, in an alcoholic medium chlorodiethylphosphate and a salt of kojic acid of the formula:

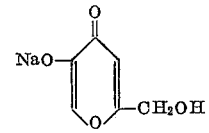

7. A process for the production of a phosphorus derivative of kojic acid of the formula:

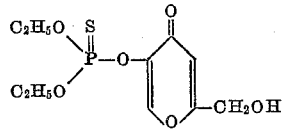

which comprises reacting, in an alcoholic medium, chlorodiethylthiophosphate and a salt of kojic acid of the formula:

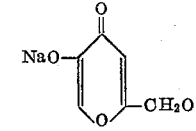

8. A pesticidal composition comprising a phosphorus derivative of kojic acid of the general formula:

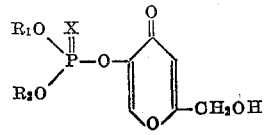

where X is selected from the group consisting of oxygen and sulphur atoms and $R_1$ and $R_2$ are each an alkyl radical containing at most 4 carbon atoms, together with an inert diluent.

9. A pesticidal composition comprising a phosphorus derivative of kojic acid of the formula:

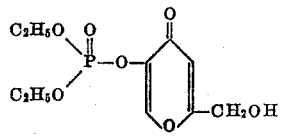

together with an inert diluent.

10. A pesticidal composition comprising a phosphorus derivative of kojic acid of the formula:

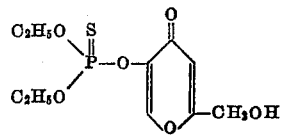

together with an inert diluent.

No references cited.